Patented Nov. 21, 1922.

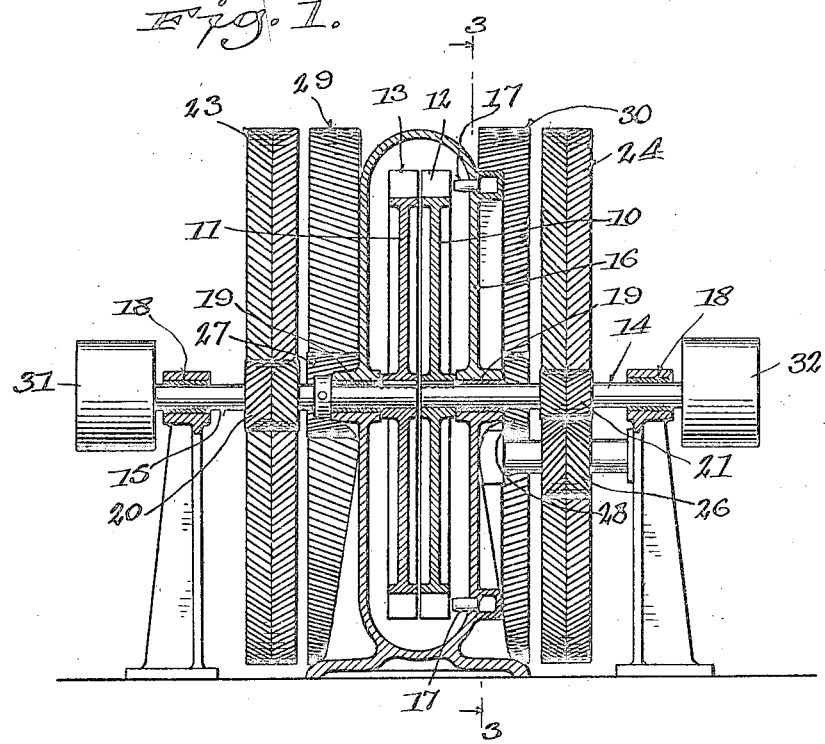
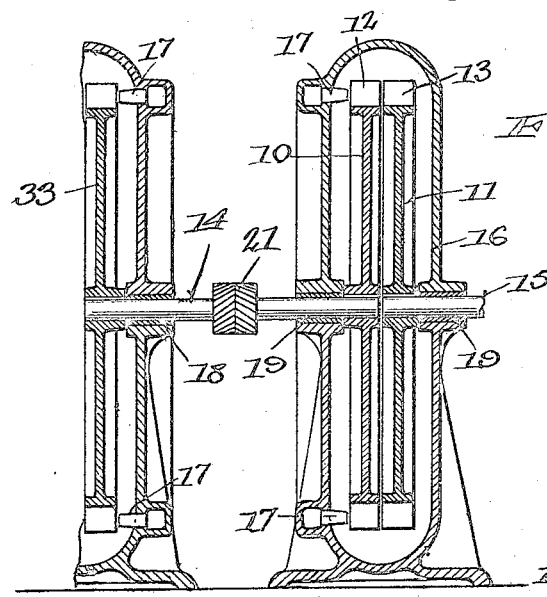

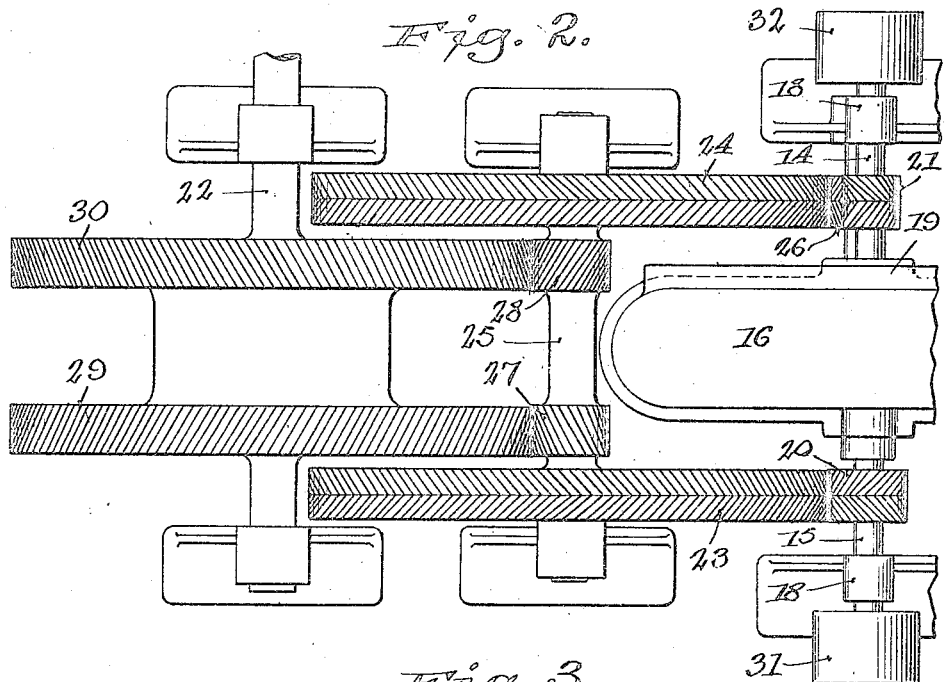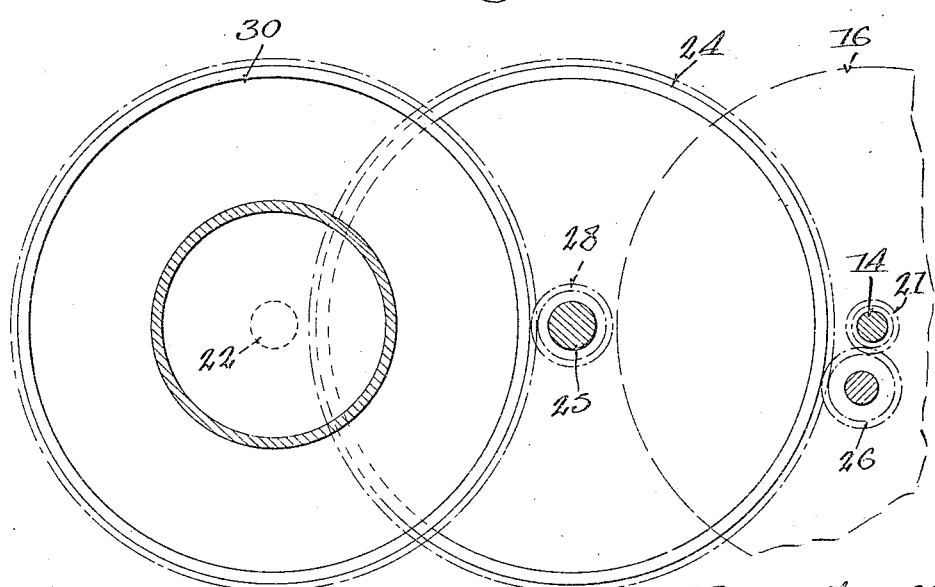

1,435,918

UNITED STATES PATENT OFFICE.

HERMAN W. FALK, PERCY C. DAY, AND OTTO A. BANNER, OF MILWAUKEE, WISCONSIN, ASSIGNORS TO THE FALK COMPANY, OF MILWAUKEE, WISCONSIN, A CORPORATION OF WISCONSIN.

ELASTIC-FLUID TURBINE.

Application filed May 8, 1920. Serial No. 379,798.

*To all whom it may concern:*

Be it known that we, HERMAN W. FALK and PERCY C. DAY, citizens of the United States, and OTTO A. BANNER, a citizen of Germany, all residing at Milwaukee, in the county of Milwaukee and State of Wisconsin, have invented a certain new and useful Improvement in Elastic-Fluid Turbines, of which the following is a full, clear, concise, and exact description, reference being had to the accompanying drawings, forming a part of this specification.

This invention relates to elastic fluid turbines, and more particularly, to that type in which a set of mechanical gears is employed for transmitting the power of the turbine proper to the driven member.

A well known type of turbine includes two adjacent oppositely rotating turbine elements designed to receive the working fluid in successive velocity stages and convert the kinetic energy thereof into rotary motion. The high efficiency of turbines of this type is well recognized. This is indicated by the numerous attempts heretofore made to effect a practical mechanical connection between the turbine elements and a common driven member, whereby power may be transmitted from both elements, rotating at high velocity, to a single driven member, rotating at a lower velocity, and thus adapt this type of turbine for use as a unit in marine and similar installations. The prime requisites of a mechanical connection of this character are efficiency, reliability and smoothness and quietness of operation. The various schemes heretofore attempted for accomplishing this purpose have fallen so far short of any practical success that up to the present time this type of turbine has been a commercial failure except in its use in turbo-generator sets, where a mechanical connection of the two wheels to one shaft is not essential.

The primary aim of the present invention is the provision of an efficient and quiet running gear set, capable of transmitting power from a pair of high velocity, oppositely rotating turbine elements, to a single low velocity driven member.

Another object is to effect a proper balancing of each of the turbine element shafts whereby the vibration of the shafts during the required high velocities, is reduced to a minimum. This feature of the invention is as applicable to those types of turbines in which a single turbine element is employed as in those which make use of oppositely rotating turbine elements.

Other objects and advantages will hereafter appear.

Two specific embodiments of this invention are illustrated in the accompanying drawings, in which:

Figure 1 is a side elevation, partly in section, of a turbine unit, embodying the features of the present invention.

Figure 2 is a plan view of the unit illustrated in Figure 1.

Figure 3 is a vertical section taken substantially on the line 3—3 of Figure 1, and Figure 4 is a portion of a similar unit illustrating a modified form.

The turbine unit illustrated in Figures 1, 2 and 3 comprises a main turbine or power unit, including a pair of oppositely rotating turbine elements mounted for rotation in opposite directions; a driven shaft; and intermediate gearing between the turbine elements and the driven shaft.

The main turbine or power unit may be of any standard or approved construction. In the present instance, however, the turbine elements thereof are in the form of wheels 10 and 11, each carrying, preferably, a peripheral ring 12 or 13 of axial flow impulse buckets or vanes. The wheels 10 and 11 are mounted side by side and are fixed, respectively, to the ends of axially aligned, drive shafts 14 and 15, in such manner that the bucket ring 12 of one wheel is immediately adjacent the bucket ring 13 of the other wheel. In accordance with the usual practice, the buckets of ring 12 are curved reversely to those of ring 13. The turbine elements are enclosed in a casing 16, of any appropriate construction, and the working fluid, such as steam, is admitted thereto through the usual expansion nozzles 17. The arrangement is such that the working fluid is delivered at high velocity and at an efficient angle from the nozzles 17 to the bucket ring 12 of the primary rotating element 10, by which a portion of the kinetic energy of the fluid is abstracted and from which the fluid is directed through the bucket ring 13 of the secondary, oppositely rotating element 11, where the remainder of the kinetic energy may be abstracted. Since this type of turbine is well known to those skilled in the art, a further or more detailed description thereof is deemed unnecessary.

The drive shafts 14 and 15 are each preferably mounted in spaced bearings 18 and 19 of any appropriate construction. A drive pinion 20 or 21, formed integral with or otherwise fixed to each drive shaft at a point between the bearings thereof, constitute the means for transmitting the power of the drive shafts to a driven shaft 22 through an intermediate gearing, preferably such as will now be described. This gearing may assume various forms but it has been found that the best results are obtained by the use of gearing which provides for a double reduction in speed between the high velocity drive shafts and the driven shaft. In the present instance, this gearing includes a pair of gears 23 and 24, preferably secured to a single intermediate shaft 25. Gear 23 meshes with pinion 20, while gear 24 meshes with an idle gear 26, which in turn meshes with pinion 21. Thus, it will be seen that the power of both of the oppositely rotating drive shafts is transmitted to the intermediate shaft to cause the intermediate shaft to rotate at a somewhat lower velocity. To effect a second reduction in speed, two small gears 27 and 28 are preferably secured to the intermediate shaft 25 and arranged to mesh with large gears 29 and 30, respectively, mounted upon the driven shaft 22. Although the several gears and pinions may be of any standard or approved type, the herring-bone type of gears is preferred, not only because intermeshing gears of this character effect a relatively smooth constant pull, but because of their ability to resist the slight end thrust in the drive shafts 14 and 15 resulting from the action of the working fluid upon the turbine elements.

Due to the exceedingly high velocities required of the drive shafts 14 and 15, any slight deviation from a mathematically correct cutting of the gear teeth in the pinions 20 and 21 or gears 23, 24 and 26 tends to set up a vibration in the drive shafts with a resulting loss of efficiency and clatter of gears. Unless each drive shaft is properly balanced, this tendency is greatly magnified. With a view of reducing this tendency to a minimum, provision is made for so balancing each drive shaft that the center of gravity of the combined weight of each drive shaft and the parts carried thereby shall substantially coincide with the center of each pinion 20 or 21 carried thereby. This may be accomplished in various ways.

Referring to Figure 1, it will be noted that the weight of each turbine element 10 or 11 shifts the center of gravity of the combined weight of each drive shaft and turbine element toward that element. In the construction illustrated in this figure, however, a counterweight 31 or 32 is mounted upon the free end of each drive shaft. The weight of each counterweight is such as to position the center of gravity of the combined weight of each drive shaft and parts carried thereby within the pinion 20 or 21, and preferably at the center thereof. Thus any unusual thrusts upon either pinion 20 or 21, due to inaccuracies in the gear teeth, is immediately transmitted to the entire shafting as a unit and is absorbed thereby without prohibitive vibration of the shaft.

A similar result is obtained by the construction illustrated in Figure 4, in which the counterweight is in the form of a turbine element 33 of any appropriate type. This turbine element may serve as a reversing turbine, or as a low pressure turbine connected in series with the high pressure turbine above described.

Thus, it will be seen that in both forms of the invention illustrated, power is transmitted from a turbine actuated drive shaft to a driven member through a transmission mechanism that communicates with the drive shaft substantially at the center of gravity of the combined weight of the shaft and parts carried thereby. It will also be noted that in each instance the center of gravity of the combined weight of each drive shaft and parts carried thereby falls between the spaced bearings 18 and 19, so that this combined weight is substantially equally distributed therebetween.

As above pointed out, the form or mounting of the turbine elements or the buckets or vanes carried thereby is quite immaterial to the present invention. For instance, instead of axial flow impulse buckets, radial flow or reaction buckets or vanes may be employed, or instead of a single row of buckets on either or both turbine elements a plurality of rows, such, for instance, as are used in the Curtis type of turbine, may be employed. Various other changes may be made in the embodiments of the invention hereinabove described without departing from or sacrificing any of the advantages of the invention as defined in the appended claims.

We claim:

1. A turbine unit having a pair of fluid actuated members mounted for rapid rotation in opposite directions and each including a shaft carrying a turbine element and a driving gear, and gears meshing with said driving gears, the center of gravity of each of said members being so disposed relative to said gears that thrusts resulting from inaccuracies in said gears are applied to said members at the centers of gravity thereof and are thus absorbed by said members without disturbing the alignment of said shafts.

2. A turbine unit having a pair of drive shafts, spaced bearings for each shaft, a turbine element mounted on the end of each shaft to rotate said shafts in opposite directions, a driven member, and means including a pinion on each shaft between said spaced bearings for transmitting motion to said driven member, the center of gravity of the combined weight of each shaft and parts carried thereby being located within each pinion.

3. A turbine unit having a pair of drive shafts, spaced bearings for each shaft, a turbine element mounted on the end of each shaft to rotate said shafts in opposite directions, a driven member, means including a pinion on each shaft between said spaced bearings for transmitting motion to said driven member, and a counterweight on each shaft for counterbalancing the weight of a turbine element.

4. A turbine unit having a pair of drive shafts, spaced bearings for each shaft, a turbine element mounted on the end of each shaft to rotate said shafts in opposite directions, a driven member, means including a pinion on each shaft between said spaced bearings for transmitting motion to said driven member, and a counterweight in the form of a turbine element on each shaft for counterbalancing the weight of one of said first named turbine elements.

5. A turbine unit having a pair of drive shafts, supports for said shafts, a driven member, motion transmission mechanism between each shaft and said driven member, a turbine element on each shaft for driving said shafts in opposite directions, and a counterweight on each shaft for counterbalancing the weight of a turbine element, at least one of said counterweights being in the form of a turbine element.

6. A turbine unit having a pair of drive shafts, supports for said shafts, a driven member, motion transmission mechanism between each shaft and said driven member, a turbine element on each shaft for driving said shafts in opposite directions, and a counterweight on each shaft for counterbalancing the weight of a turbine element.

7. In an elastic fluid turbine the combination of a shaft, a bearing therefor, a turbine element mounted on said shaft on one side of said bearing, a counterweight mounted on said shaft on the other side of said bearing, and a driven member operatively connected with said shaft, at the center of gravity of the combined weight of said shaft and parts carried thereby.

8. In an elastic fluid turbine the combination of a shaft, a bearing therefor, a turbine element mounted on said shaft on one side of said bearing, a counterweight in the form of a turbine element mounted on said shaft on the other side of said bearing, and transmission mechanism operatively connected with said shaft at the center of gravity of the combined weight of said shaft and parts carried thereby.

9. In an elastic fluid turbine the combination of a shaft, spaced bearings therefor, and members on said shaft including a turbine element mounted on one side of said spaced bearings, and a driving pinion intermediate said bearings, the arrangement being such that the center of gravity of the combined weight of said shaft and members carried thereby is positioned within said pinion.

10. An elastic fluid turbine including a pair of elastic fluid operated rotary members each including a shaft carrying a turbine element, supports therefor, and transmission mechanism including a pinion on each rotary member arranged at the center of gravity thereof.

11. A turbine unit having a fluid actuated rotary member including a shaft carrying a turbine element and a driving gear, and a gear meshing with and driven by said driving gear, the center of gravity of said rotary member being so disposed that thrusts resulting from inaccuracies in said gears are applied to said member at the center of gravity thereof and thus are absorbed by said member without disturbing the alignment of said shaft.

12. A turbine unit having a fluid actuated rotary member, including a shaft carrying a turbine element and a herringbone gear, and a herringbone gear meshing with and driven by said first named gear, the center of gravity of said rotary member being disposed within said first named gear for the purposes described.

13. An elastic fluid turbine including a pair of fluid actuated separate rotary members, supports therefor, a driven shaft and transmission mechanism including a pinion on each member at the center of gravity thereof, and a set of gears for effecting a double speed reduction between said members and shaft.

14. An elastic fluid turbine including a pair of fluid actuated separate rotary members, supports therefor, a pinion on each member at the center of gravity thereof, a driven shaft, an intermediate shaft, gearing between each pinion and said intermediate shaft, and gearing between said intermediate shaft and said driven shaft.

15. An elastic fluid turbine including a pair of oppositely rotating fluid actuated members, supports therefor, a pinion on each member at the center of gravity thereof, a driven shaft, and transmission mechanism between said pinions and said shaft including an idle gear.

16. An elastic fluid turbine including a fluid actuated rotary member, a pinion on said member including a shaft carrying a turbine element at the center of gravity thereof, a driven shaft, and a transmission mechanism for effecting a double speed reduction between said pinion and said shaft.

17. An elastic fluid turbine including a pair of elastic fluid operated rotary members, supports therefor, and gearing on each member extending on both sides of the center of gravity thereof to transmit power from said members.

18. In an elastic fluid turbine the combination of a shaft, a support therefor, and members carried by said shaft including a turbine element on one end thereof and gearing arranged to extend on both sides of the center of gravity of the combined weight of said shaft and members carried thereby.

In witness whereof, we hereunto subscribe our names this 6th day of May, 1920.

HERMAN W. FALK.
PERCY C. DAY.
OTTO A. BANNER.